United States Patent [19]

Bassaler

[11] Patent Number: 5,742,254

[45] Date of Patent: Apr. 21, 1998

[54] THREE-AXIS STABILIZED GEOSTATIONARY SATELLITE CARRYING OUT RADAR SURVEILLANCE OF THE SURROUNDING SPACE

[75] Inventor: Pierre Bassaler, Mouans Sartoux, France

[73] Assignee: Aerospatiale Societe Nationale Industrielle, Paris, France

[21] Appl. No.: 567,331

[22] Filed: Dec. 5, 1995

[30] Foreign Application Priority Data

Dec. 8, 1994 [FR] France ................................ 94 14769

[51] Int. Cl.⁶ .................................................. H01Q 1/38
[52] U.S. Cl. .............................. 343/700 MS; 343/853; 343/DIG. 2; 244/173; 244/168
[58] Field of Search .......................... 343/700 MS, 853, 343/DIG. 2; 244/171, 173, 158 R, 170, 168

[56] References Cited

U.S. PATENT DOCUMENTS

| | | | |
|---|---|---|---|
| 4,562,441 | 12/1985 | Beretta et al. | 343/DIG. 2 |
| 4,759,517 | 7/1988 | Clark | 244/168 |
| 4,843,294 | 6/1989 | Bhat et al. | 318/696 |
| 4,847,506 | 7/1989 | Archer | 343/872 |
| 5,169,094 | 12/1992 | Maute et al. | 343/DIG. 2 |
| 5,206,655 | 4/1993 | Caille et al. | 343/700 MS |
| 5,257,759 | 11/1993 | Bender | 244/168 |
| 5,283,592 | 2/1994 | Bogorad et al. | 343/DIG. 2 |
| 5,293,171 | 3/1994 | Cherrette | 343/700 MS |
| 5,327,150 | 7/1994 | Cherrette | 343/770 |
| 5,430,451 | 7/1995 | Kawanishi et al. | 343/DIG. 2 |

FOREIGN PATENT DOCUMENTS

| | | | |
|---|---|---|---|
| 0596618A2 | 5/1994 | European Pat. Off. . | |
| 4243395A1 | 6/1993 | Germany . | |
| 0012244 | 1/1979 | Japan | 343/DIG. 2 |
| 0041203 | 2/1986 | Japan | H01Q 1/28 |
| 0021703 | 1/1990 | Japan | H01Q 1/28 |

OTHER PUBLICATIONS

Patent Abstracts of Japan, vol. 5, No. 3, 01/10/81 (JP 55-133105)

ESA Journal, vol. 18 #2, Baetz et al; "Inter-Satellite Tracking for Co-Location", 1994.

IEEE Antennas & Propagation Soc. Internat'l. Symposium, 1993, vol. 1, 06/28/93, pp. 226-229, Mangenot et al.

*Primary Examiner*—Michael C. Wimer
*Assistant Examiner*—Tan Ho
*Attorney, Agent, or Firm*—Evenson, McKeown, Edwards & Lenahan, PLLC

[57] ABSTRACT

A geostationary satellite includes a three-axis stabilized body including an onboard computer and at least one solar generator wing extending in a longitudinal direction from the body and coupled to the body by a drive system controlled by the onboard computer and adapted to rotate the wing at least about its longitudinal axis. The satellite further comprises a static radar surveillance device including at least one antenna formed of elementary plane radiating patches and adapted to scan at least part of the space surrounding the satellite body.

18 Claims, 6 Drawing Sheets

THREE-AXIS STABILIZED GEOSTATIONARY SATELLITE CARRYING OUT RADAR SURVEILLANCE OF THE SURROUNDING SPACE

BACKGROUND OF THE INVENTION

1. Field of the Invention

The invention is particularly, but not exclusively, concerned with the co-location of a plurality of geostationary satellites.

2. Description of the Prior Art

A geostationary satellite is a satellite in a terrestrial orbit such that normally (i.e. subject to correct operation of its attitude and orbit control system) it remains at all times vertically above the same area on the Earth. There is only one orbit that satisfies this condition (the angular speed of the satellite about the center of the Earth must be equal to the angular speed of rotation of Earth and this orbit must be in the equatorial plane): it is called the geostationary orbit and its altitude is in the order of 36 000 km.

Geostationary satellites are of great practical benefit, especially in the field of telecommunications (telephone and TV broadcasting in particular): satellites minimize the telecommunication infrastructures required on the ground and do not suffer from limitations due to geographical features (for example mountains) that may impede telecommunications at ground level.

Given their great practical benefit and the fact that there is only one geostationary orbit, there has begun a move towards each satellite having a smaller and smaller individual slot in the orbit. At present there are about 700 geostationary satellites (which corresponds to about one satellite every half-degree of orbit).

Efforts have been made to guarantee that geostationary satellites can be ejected into a higher orbit at the end of their useful life (this has made it necessary to be able to monitor the consumption of propellants in order to be able to detect as accurately as possible the moment at which the remaining quantity of propellants is just sufficient to eject the satellite out of the geostationary orbit).

However, the existence of older satellites that remain in geostationary orbit even though their useful life has finished (no provision was made at the time to guarantee their ejection), the tendency of satellite operators to provide for increasingly long useful lives (currently required to be in the order of ten years), the existence of a heavy demand for slots in the geostationary orbit, the fact that all slots in the geostationary orbit are not of equal interest (slots above oceans, especially the Pacific Ocean, are of less benefit than slots over land) and the reluctance of some operators to transmit from satellites far away from their customers make it necessary to provide on the ground either a plurality of fixed parabolic antennas each pointing to one of the satellites concerned or complex and motorized parabolic antennas so that the pointing direction can be changed (in practice, differences in the pointing direction are complemented by different kinds of signal processing), and finally the preference for several small satellites rather than one large satellite are all factors encouraging the international authority (WARC) responsible for allocating slots in the geostationary orbit to accept the presence of more than one satellite in the same slot.

These satellites are said to be "co-located". The following description does not concern itself with the allocation of frequencies to the satellites, which must naturally not interfere with each other if a good quality of communications with the ground (in both directions: ground-to-satellite and satellite-to-ground) is to be guaranteed.

It is important to understand that co-location leads to very serious practical problems. In particular, it is essential to avoid collisions as this could eventually lead to pollution of the orbit by debris.

It is readily understandable that co-location therefore calls for surveillance of the respective positions of the co-located satellites.

This surveillance is usually effected from the ground using information received from each satellite and it usually takes around 24 hours to obtain a first estimate and 48 hours to obtain precise data on the actual orbits and consequently on the relative positions of the satellites. These time-delays make it necessary to provide substantial margins in the determination of strategy.

It is obviously preferable to measure the distance between co-located satellites directly.

Various documents have already touched on this subject:

"intersatellite tracking for co-location" by BAETZ, SOOP and SOOPA published in ESA Journal 1994, Vol 8: this solution entails measuring the relative distance between two satellites by measuring the time required for a carrier transmitted by one of the satellites to make the return journey via the other satellite, where it is amplified and regenerated. This requires the activation of a transmit/receive system on each of the satellites.

U.S. Pat. No. 4,375,697 and U.S. Pat. No. 4,494,211: these documents describe the exchange of signals by means of antennas on the various satellites concerned and which must continue to face each other; this therefore assumes that the satellites are maintained in fixed relative positions.

FR-A-2 569 838, FR-A-2 602 057, FR-A-2 688 613, FR-A-2 604 796 and FR-A-2 672 690: these documents, which relate to the situation of a hunter aiming at a target, employ optical measurements, usually measurements of apparent size; again it is obligatory for one of the craft to be pointed towards the other.

FR-A-2 689 855: a dedicated measuring unit (for measuring angular offset or DOPPLER shift) is mounted on a dedicated drive mechanism which rotates and pivots it in a range of about ±45° out of the plane of the orbit and through 360° in the plane of the orbit; the aim is to monitor a set of perfectly identified satellites equipped with rings of reflectors and transponders transmitting recognition codes in response to pulses received from the measurement unit; the relative positions of the satellites are measured continuously.

It is seen that the direct measurement of the distance between craft, using the prior art solutions, implies either the cooperation of complementary members of each of the craft concerned or the maintaining of a predetermined relative orientation between them. Moreover, the dedicated means required for these measurements are complex and bulky. In any event, none of these documents concerns itself with monitoring the space surrounding a satellite.

Thus none of these documents proposes a solution to the following problem, which is that which the invention addresses:

enabling a three-axis stabilized geostationary satellite to monitor the space surrounding it, in particular to be able to detect quickly and monitor the approach of another body, identified or not, for example another geostationary satellite with which it may be co-located, without requiring any regular cooperation between them, without significantly interfering with the nominal mission of the satellite concerned, without significantly modifying the satellite or significantly increasing its weight or overall size, or introducing significant sources of equipment failures, and without requiring significant consumption of power, compared to what is required for the nominal function of the satellite, and in particular without requiring the installation of additional moving parts.

Note that the invention covers the situation in which the other body is not identified (it may be any of a group of satellites co-located with the satellite in question, or even a non-artificial heavenly body); the solution adopted must therefore be operative even in the absence of any cooperation by said other body; in particular, the solution adopted must be operative even with satellites of an earlier generation than the satellite in question, including existing satellites. However, the invention does not rule out the making of necessary provisions on said other body where this is possible (satellites not yet launched).

To meet this objective, the invention relies on the principle of radar.

It has already been proposed to use radar on a spacecraft (see U.S. Pat. No. 3,888,122), although essentially for altitude measurements (radar altimeters), i.e. to measure distances in approximately fixed predetermined directions substantially along the local vertical. A vague mention of a radar sensor occurs in the document U.S. Pat. No. 4,375,697 previously mentioned but, apart from the fact that no precise information is given as to its construction, location and operation, it should be noted that this radar sensor is operative only in a highly specific context (apparently with no measurement of distance), namely preliminary positioning of a set of satellites each of which must thereafter remain pointed towards a central satellite, in a precise overall configuration, for a common mission (all of the satellites in the set thus collaborate and are perfectly identified, and each is designed in conjunction with the others since in particular for each peripheral satellite there is a respective fixed antenna on the central satellite, which must therefore be designed accordingly). There is no mention of the use of radar sensing in the document FR-A-2 689 855 already mentioned.

Another type of substantially fixed configuration of a set of satellites having a common mission is described in the document FR-A-2 539 102 which teaches the provision of a "centralizing" satellite away from other satellites to facilitate communications between the "centralizing" satellite and the other satellites, without the inherent problems involved in the use of an antenna capable of rotating 360°.

It is therefore clear that the prior art is not concerned with monitoring the space surrounding the satellite since it always implies the imposition of conditions on each of the craft between which the distance is to be measured (in particular this refers to their relative orientations) and, since if rotation of an antenna is mentioned, it is to set aside this idea as being complex, and, since if radar is mentioned in a connection other than altitude measurement, it is in an entirely vague and uncertain way.

Thus the prior art does not provide any satisfactory solution to the problem as previously stated.

SUMMARY OF THE INVENTION

The invention proposes a geostationary satellite including a three-axis stabilized body including an onboard computer and at least one solar generator wing extending in a longitudinal direction from the body and coupled to the body by a drive system controlled by the onboard computer and adapted to rotate said wing at least about its longitudinal axis, the satellite further comprising a static radar surveillance device including at least one antenna formed of elementary plane radiating patches and adapted to scan at least part of the space surrounding the satellite body.

The use of antennas made up of elementary flat radiating patches (enabling the use of printed circuit technology) results in low cost, compact overall size and very easy installation.

In this context, the expression "static device" means a device with no specific part mobile relative to the remainder of the device. It will become clear later that this does not exclude the device taking advantage of the existence on the satellite of surfaces mobile relative to the body (for example on a solar generator). Nevertheless, as an alternative, it is feasible to provide on faces of the body matrices of elementary plane radiating patches which can be scanned electronically.

At least some of the following preferred features of the invention may be combined with others:

- the static radar surveillance device includes rows of elementary plane radiating patches laid out flat on a portion of the wing, on a face of the wing opposite the face carrying solar cells,
- the static radar surveillance device includes an electronic circuit board carried by the wing,
- the electronic circuit board is installed within the thickness of the wing,
- the rows are disposed transversely to the longitudinal axis,
- the wing is formed of a plurality of panels articulated together about transverse deployment axes and the static radar surveillance device includes a first row of elementary plane radiating patches along a transverse edge of one panel and a second row of elementary plane radiating patches along the other transverse edge of said panel,
- one row is for transmitting and the other row is for receiving echoes,
- the static radar surveillance device includes an electronic circuit board installed within the thickness of said panel,
- the static radar surveillance device operates in the C band,
- the static device is at least in part installed in the satellite body.

It is easy to integrate an electronic circuit board into the thickness of a solar panel (the solar cells are glued to a honeycomb panel which is typically between 1 cm and 2 cm thick).

Objects, features and advantages of the invention emerge from the following description given by way of non-limiting example with reference to the appended drawings.

DETAILED DESCRIPTION OF THE PREFERRED EMBODIMENTS

Figure 1:
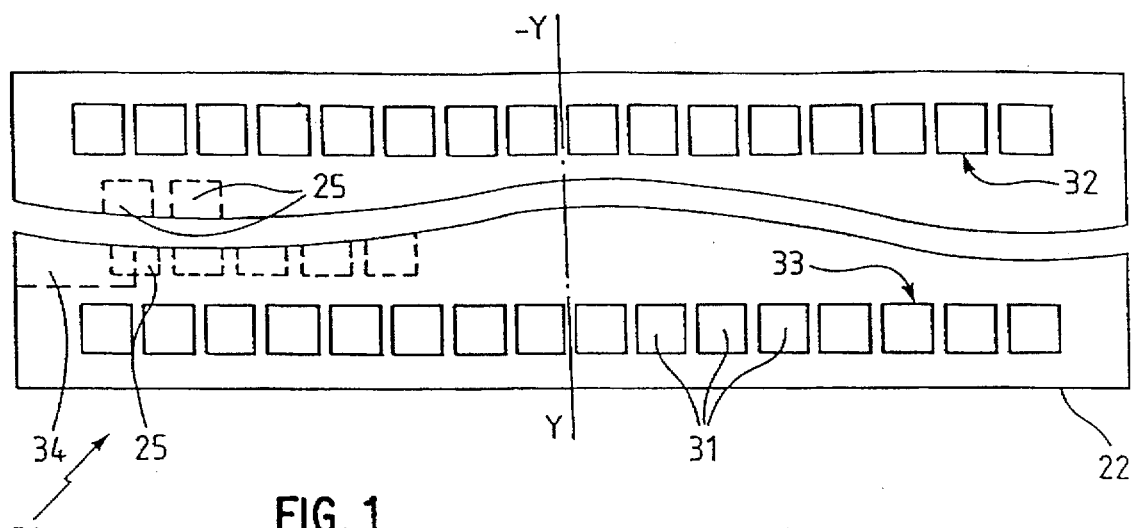
FIG. 1 is a diagrammatic view of part of a satellite provided with a static radar surveillance device.

FIG. 1 is a diagram showing part of a geostationary satellite including a body 10 and at least one solar generator wing 20.

The body 10 is stabilized about three reference axes related to it, namely a pitch axis Y perpendicular to the plane of the orbit and classically facing SOUTH, a roll axis X tangential to the orbit and in the same direction as the local orbital speed (here this axis is shown as coplanar with the wing 20, but this is obviously not essential), and a yaw axis Z facing the Earth (in this example perpendicular to the plane of the drawing). The body 10 includes at least one onboard computer 11 and sensors, actuators and antennas (not shown) which contribute to attitude and orbit control of the satellite body and to exchange of data and commands with the ground.

The wing 20 extends in a longitudinal direction that is conventionally parallel to the pitch axis. It is coupled to the body by a drive mechanism 21 which, under computer control, rotates the wing about its longitudinal axis so that one face of the wing, covered with a two-dimensional arrangement of solar cells 25, normally faces at least approximately towards the Sun, regardless of the position of the satellite in its orbit.

Figure 2:
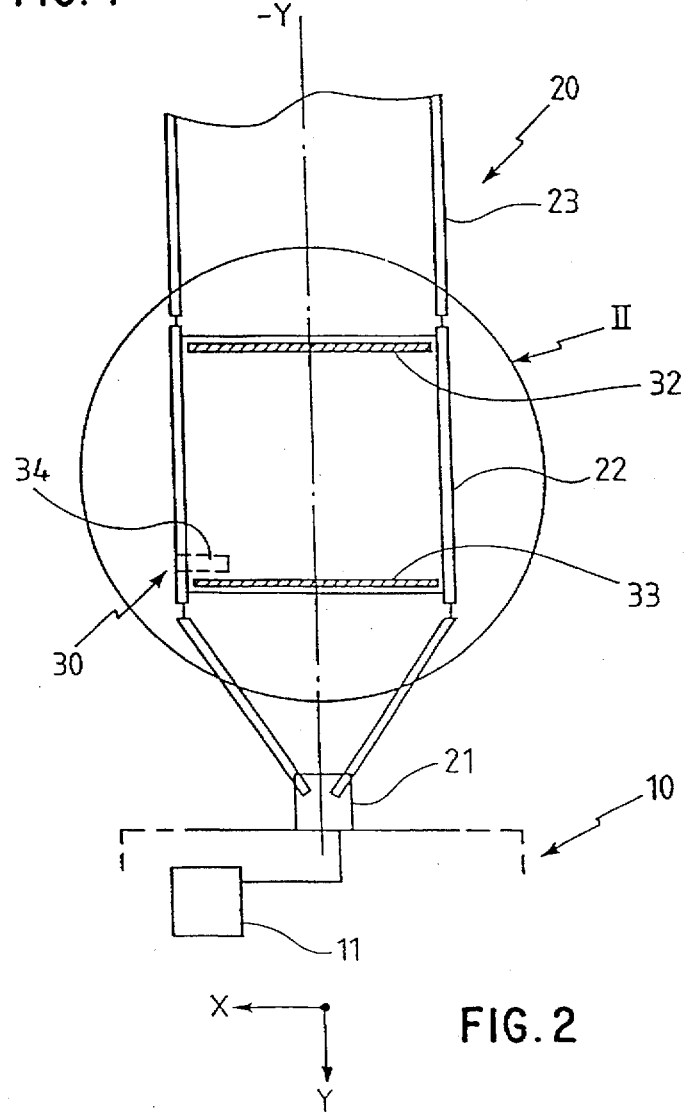
FIG. 2 is a view to a larger scale of the detail II of FIG. 1.

In accordance with the invention, the satellite further includes a static radar surveillance device 30 including one or more antennas formed of elementary plane radiating patches 31 (see FIG. 2). It will be seen later that this device 30 is adapted to scan at least part of the space surrounding the body of the satellite.

As shown here by way of example, the device 30 advantageously includes two antennas 32 and 33 formed by rows of patches 31, these antennas being preferably laid out flat on the solar generator.

The device 30 further includes an electronic circuit board 34 providing all the usual signal processing functions and connected to the antennas 32 and 33. This board is also preferably installed on the solar generator, for example within its thickness. This makes the electrical installation very simple since all the RF signals, which in the C band require the use of coaxial cables not compatible at this time with rotary contacts, travel over only short distances, whereas only electrical signals have to pass through the drive mechanism: the person skilled in the art knows how to achieve this.

In the conventional way, the wing 20 is formed by a longitudinal succession of panels 22, 23, etc articulated about transverse axes. The antennas 32 and 33 and the circuit board 34 are preferably on the same panel. This is preferably the first panel 22, i.e. the panel of the wing in question nearest the body.

The two antennas 32 and 33 are respectively a transmit antenna and a receive antenna.

In this embodiment each antenna 32 or 33 is formed of a single row of patches 31 preferably transverse to the longitudinal axis Y—Y of the wing. For good electronic decoupling there is advantageously a large distance between the rows, for example at least 70 cm; in the example shown the rows run along the opposite transverse edges of the panel 22.

The solar cells 25 are on the opposite side of the wing to the antenna patches 31.

Figure 3:
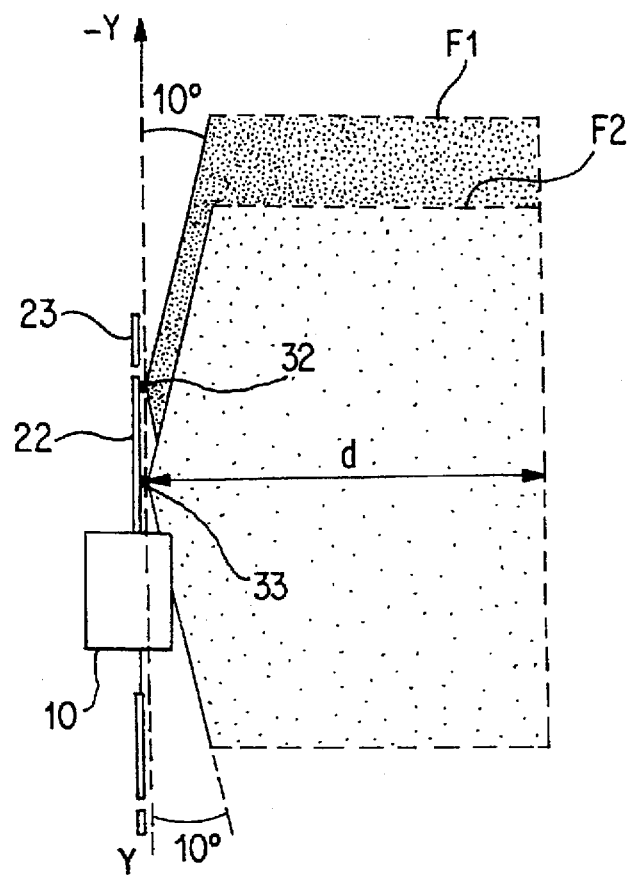
FIG. 3 is a diagram showing the approximate shape of the field of view of the static radar surveillance device in a plane perpendicular to the wing of the solar generator carrying the device and passing through the longitudinal axis of the latter.
Figure 4:
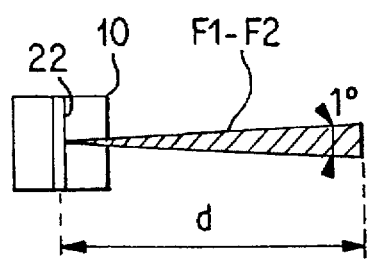
FIG. 4 is a similar diagram but in a transverse plane perpendicular to said wing.

FIGS. 3 and 4 are diagrams showing the shape of the beams of the antennas 32 and 33. Since the antennas are transverse rows of patches, their beams F1 and F2, which largely overlap, subtend a very large angle (almost 160°) on the longitudinal axis Y—Y and a very small angle (approximately 1°) in the transverse direction. Thus rotation of the wing once about its longitudinal axis scans virtually all of the space surrounding the satellite over a distance (or range) d that depends on the characteristics of the antennas (and also, of course, on the radar signature of the body to be detected, i.e. how well it sends back echoes).

The antennas 32 and 33 preferably operate in the C band (4.2 GHz–4.4 GHz), one advantage of which is that this band is used by existing equipment, in particular in the aeronautical field. The range d is estimated at about 10 km with an input power of 1 W if it is possible to improve the radar signature of the bodies to be detected, in particular by installing retroreflectors (entirely passive and very light devices, typically with a diameter equal to 20 cm) on the faces of the other satellite under surveillance.

Other frequency bands can of course be used, typically between 1 GHz and 100 GHz, for example, or even lower frequencies (for example the S, Ku, X, etc bands).

Figure 5:
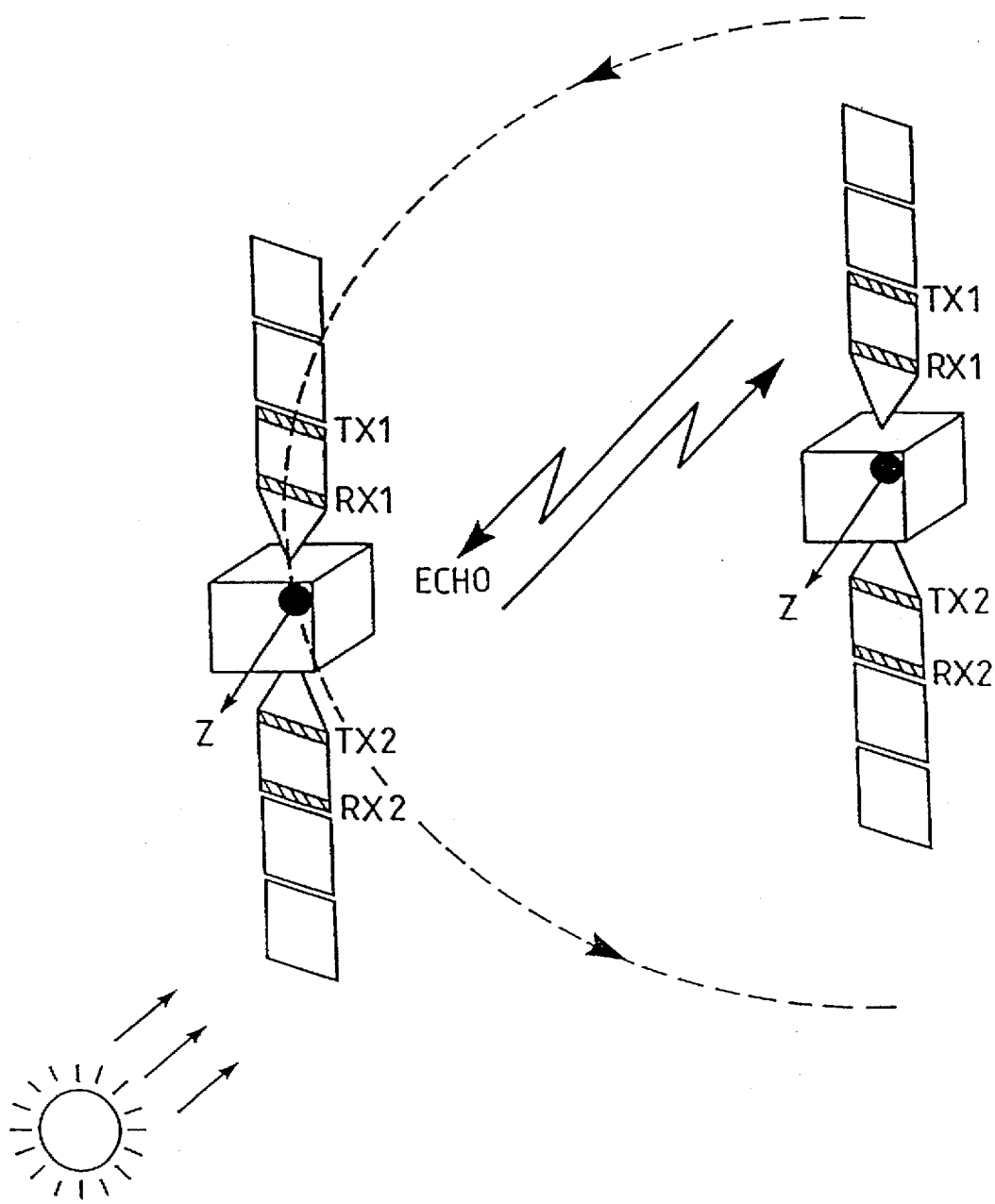
FIG. 5 is a diagram showing two co-located satellites in space provided with respective similar devices each adapted to sense the presence of the other satellite.

If the satellite has two solar wings, antennas are preferably installed on both wings (in FIG. 5 there are two transmit antennas TX1 and TX2 and two receive antennas RX1 and RX2).

Figure 6:
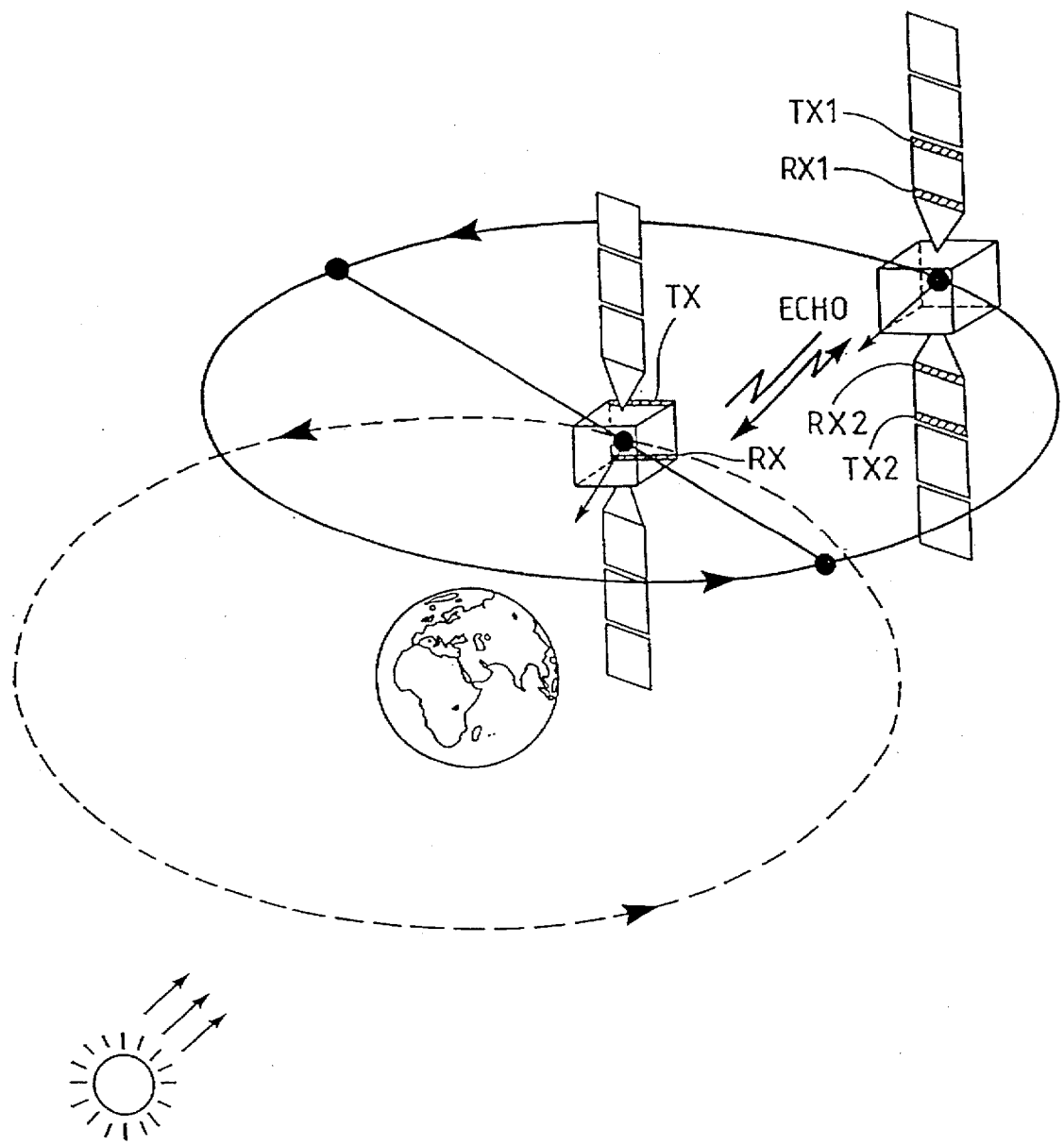
FIG. 6 is a similar diagram with different type devices.

Complementary antennas can advantageously be installed on the body of the satellite, preferably on the face away from the Earth (opposite to the direction Z, which explains why, since Z points out of the plane of the drawing in FIG. 5, the additional antennas cannot be seen; they can be seen in FIG. 6, on the other hand). Antennas of this kind carried by the body carry out a scan in 24 hours (for each orbit of the satellite around the Earth).

Scanning by the wings can be effected faster by activating the fast rotation mode of the wings (in this case a complete scan can be effected in 18 minutes, or even in 9 minutes if the wings rotate in opposite directions). A scan of this kind can be instigated after each maneuver to correct the orbit of the satellite in question, or even of each such operation by each other satellite co-located with it, and naturally each time that an incident is detected (for example, if one of the co-located satellite loses its attitude and goes to the Sun-pointing mode).

FIG. 6 shows two co-located satellites. An effective strategy in this situation is to make the orbits of the satellites very slightly different. It can then be shown that each satellite rotates around the other in an almost elliptical relative orbit. To reduce the risk of interference or collision between the co-located satellites the plane of this relative orbit is preferably neither parallel to the equatorial plane nor perpendicular to the yaw axis Z. As a result the fact that the antennas 32 and 33 of the wings cannot scan a cone with a half-angle equal to 10° and having the pitch axis as its axis is no problem.

The inclination of the relative orbit to the yaw axis is advantageously about 40° to 50°.

In FIG. 5, each of the satellites has antennas on the first panel of each of its wings. The antennas are preferably duplicated for redundancy and to reduce the scanning time (since the drive mechanisms have a given maximal speed). Naturally, one of the satellites can be inert and only one wing of the other satellite equipped with antennas.

FIG. 6 shows an alternative embodiment in which one of the satellites is of the aforementioned type and the other satellite has only transmit and receive antennas (TX and RX) mounted on its body, here on the face away from the Earth.

The radiating patches 31 are 10 cm×10 cm, for example, and 2.5 mm thick (they are therefore small in size and light in weight). Each row across a panel 22 that is 2 meters wide includes 16 patches, for example. If the height of the panels (parallel to the Y axis) is 2.6 meters, it is checked that good electromagnetic decoupling is obtained.

The specifications of the antenna are, for example:
input power: 1 W
wavelength: 0.070 m
gain: 20 dBi
transmit power: 0 dBW
receiver equivalent temperature: 300°
receive bandwidth: 30 kHz
received power: −146 dBW
noise level: −158 dBW With the above specifications, an object with a radar equivalent surface area of $0.1 \text{ m}^2$ can be detected at a range of 1 km with an accuracy of about 1 meter.

An amplifier for the transmit antenna and a preamplifier for the receive antenna, together with an electronic transducer (known in itself), are all that are required to convert the RF signals received into electrical signals that can easily be passed through the prior art drive mechanisms to the signal processing circuits proper.

For a power of around 1 W the additional mass is at most 4 kg for the devices carried by the body and 2 kg for the devices carried by each wing.

The invention is of course generalizable to the situation with more than two co-located satellites.

Virtually continuous surveillance is possible (all that is required is to activate the antennas and the drive mechanisms accordingly, as required).

Figure 7:
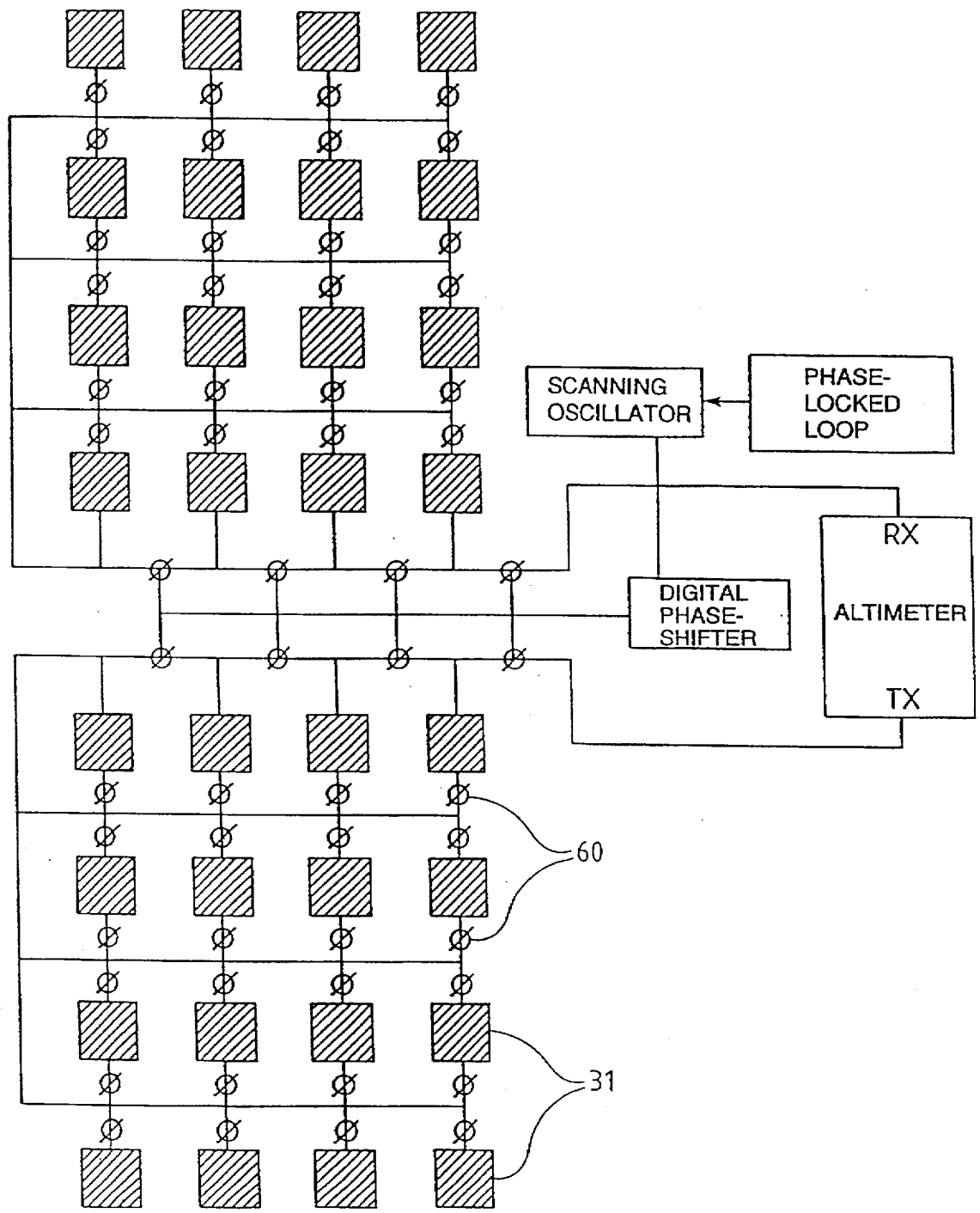
FIG. 7 is a functional block diagram showing a matrix arrangement of plane radiating patches.
Figure 8:
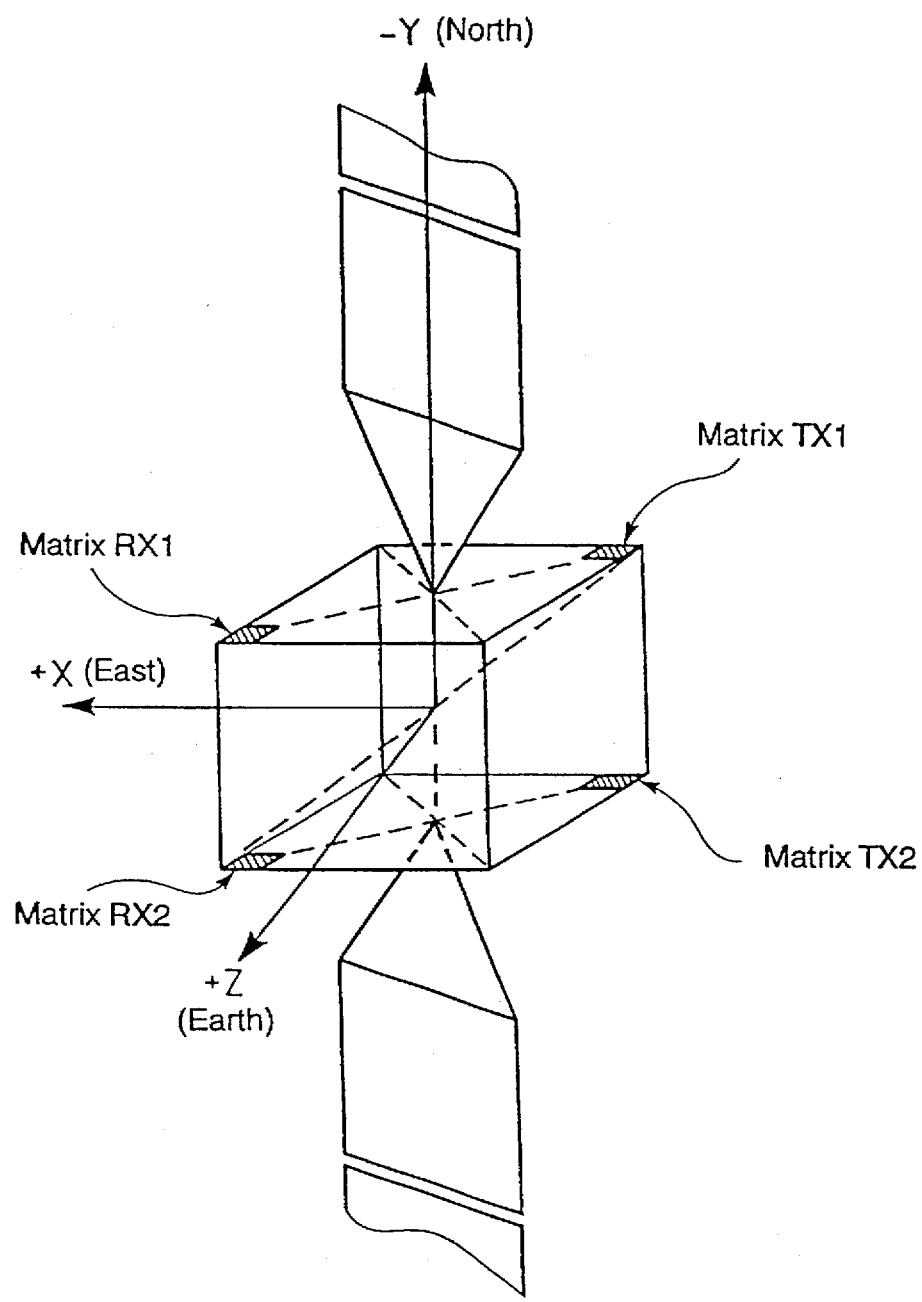
FIG. 8 is a diagram showing a configuration with matrices of radiating patches.

FIGS. 7 and 8 show a configuration corresponding to electronic scanning by adding phase-shifters 60 (which naturally makes the electronics slightly more complex than in the previous configurations).

Matrices of radiating patches (4×4 matrices in the FIG. 7 example) are installed on the NORTH and SOUTH faces of the satellite body, at the (X, Z) and (−X, −Z) corners in the FIG. 8 example.

Scanning can be (electronically) limited to the plane of movement relative to the other body. This plane is readily determinable on the ground. The scanning methods will be evident to the person skilled in the art. If required, scanning over $4\pi$ steradians can therefore be avoided, and the energy more finely focused to increase the range of the radar surveillance device.

It may be beneficial to combine this configuration with the previous configuration involving scanning by the wings, especially:

1. in the event of loss of attitude of a satellite, the path of which is no longer accurately known,
2. in the event of intrusion by a foreign body.

Note that the matrices of radiating patches enable determination not only of the distance to the other body but also its position relative to the satellite (by determination of the elevation and the azimuth in the reference trihedron of the satellite).

It goes without saying that the foregoing description has been given as a non-limiting example only and that numerous variants can be proposed by the person skilled in the art without departing from the scope of the invention.

There is claimed:

1. Geostationary satellite including a three-axis stabilized body including an onboard computer and at least one solar generator wing extending in a longitudinal direction from the body and coupled to the body by a drive system controlled by the onboard computer and adapted to rotate said wing at least about its longitudinal axis, said satellite further comprising a static radar surveillance device including at least one antenna located on a backside of said at least one solar generator wing, said antenna comprising elementary plane radiating patches and adapted to scan at least part of the space surrounding said satellite body.

2. Geostationary satellite according to claim 1 wherein said static radar surveillance device includes rows of elementary plane radiating patches laid out flat on a portion of said wing, on a face of said wing opposite the face carrying solar cells.

3. Geostationary satellite according to claim 2 wherein said static radar surveillance device includes an electronic circuit board carried by said wing.

4. Geostationary satellite according to claim 3 wherein said electronic circuit board is installed within the thickness of said wing.

5. Geostationary satellite according to claim 2 wherein said rows are disposed transversely to said longitudinal axis.

6. Geostationary satellite according to claim 5 wherein said wing is formed of a plurality of panels articulated together about transverse deployment axes and said static radar surveillance device includes a first row of elementary plane radiating patches along a transverse edge of one panel and a second row of elementary plane radiating patches along the other transverse edge of said panel.

7. Geostationary satellite according to claim 6 wherein one row is for transmitting and the other row is for receiving echoes.

8. Geostationary satellite according to claim 6 wherein said static radar surveillance device includes an electronic circuit board installed within the thickness of said panel.

9. Geostationary satellite according to claim 1 wherein said static radar surveillance device operates in the C band.

10. Geostationary satellite according to claim 1 wherein said static device is at least in part installed in at least part of said satellite body.

11. A geostationary satellite comprising:

a three-axis stabilized body including an onboard computer;

at least one solar generator wing extending in a longitudinal direction away from said body and having a face provided with solar cells;

drive rotational means coupling said at least one solar generator wing to said body, said drive rotational means being controlled by said onboard computer and being able to rotate said at least one solar generator wing substantially about at least said longitudinal direction; and radar surveillance means for surveilling a space surrounding said geostationary satellite, comprising at least one antenna located on said at least one solar generator wing, wherein said antenna comprises elementary plane radiating patches, whereby rotation of said at least one solar generator wing substantially about said longitudinal direction allows a scanning of said space surrounding said geostationary satellite by said antenna, wherein said antenna is located on a face of said at least one solar generator wing opposite said face provided with said solar cells.

12. A geostationary satellite according to claim 11, further comprising an electronic circuit processing board located within a thickness of said at least one solar generator wing and connected to said antenna.

13. A geostationary satellite according to claim 11, wherein said elementary plane radiating patches form at least one row of patches extending parallel to a direction transverse to said longitudinal direction.

14. A geostationary satellite according to claim 13, wherein said at least one solar generator wing comprises a plurality of panels articulated to each other and having transverse edges and wherein said elementary plane radiating patches form two rows of patches located on a same panel near said transverse edges of said panel.

15. A geostationary satellite according to claim 14, wherein one of said rows of patches is a radar signal transmit antenna and the other of said rows of patches is an echo receive antenna.

16. A geostationary satellite according to claim 11, wherein said elementary plane radiating patches form at least two spaced apart rows of patches extending parallel to a direction transverse to said longitudinal direction, one of said rows of patches being a radar signal transmit antenna and another one of said rows of patches being an echo receive antenna.

17. A geostationary satellite according to claim 11, wherein said radar surveillance device operates in the C band.

18. A geostationary satellite according to claim 11, wherein said radar surveillance device further comprises radiating patches located on said satellite body and adapted to scan electronically a part of said space surrounding said geostationary satellite.

* * * * *